United States Patent [19]

Buysch et al.

[11] Patent Number: 5,061,752
[45] Date of Patent: * Oct. 29, 1991

[54] ANTISTATIC, THERMOPLASTIC MOULDING COMPOUNDS BASED ON AROMATIC VINYL POLYMERS II

[75] Inventors: Hans-Josef Buysch; Norbert Schön, both of Krefeld; Herbert Eichenauer, Dormagen; Karl-Heinz Ott, Leverkusen; Alfred Pischtschan, Kuerten-Eichhof, all of Fed. Rep. of Germany

[73] Assignee: Bayer Aktiengesellschaft, Bayerwerk, Fed. Rep. of Germany

[*] Notice: The portion of the term of this patent subsequent to Jun. 13, 2006 has been disclaimed.

[21] Appl. No.: 373,341

[22] Filed: Jun. 29, 1989

Related U.S. Application Data

[63] Continuation of Ser. No. 151,285, Feb. 1, 1988, abandoned.

[30] Foreign Application Priority Data

Feb. 13, 1987 [DE] Fed. Rep. of Germany ....... 3704486

[51] Int. Cl.$^5$ .................... C08G 63/48; C08G 63/91; C08L 51/00
[52] U.S. Cl. ......................................... 525/64; 525/67
[58] Field of Search .................................... 525/64, 67

[56] References Cited

U.S. PATENT DOCUMENTS 4,435,541  3/1984  Brandstetter et al. ............... 525/64
4,839,421  6/1989  Buysch et al. ....................... 525/67

Primary Examiner—Marion E. McCamish
Assistant Examiner—Susan Berman
Attorney, Agent, or Firm—Connolly and Hutz

[57] ABSTRACT

Thermoplastic moulding compositions composed of
I) 99.8–95% by weight of
 (A) 0–100% by weight of one or more graft polymers comprise the monomers styrene, α-methyl styrene, methyl methacrylate or a mixture of 95–50% by weight of styrene, α-methyl styrene, ring substituted styrene, methyl methacrylate or mixtures thereof with 5–50% by weight of methacrylonitrile, acrylonitrile, maleric acid anhydride, N-substituted maleric imides or mixtures thereof, grafted onto a rubber substrate, and
 B) 100 to 0%, by weight of one or more thermoplastic vinyl polymers, and
II) 0.2 to 5% by weight of a polyalkylene ether modified by a radical former which can be compounds conventionally used as an initiator for radical polymerization such as peroxides.

4 Claims, No Drawings

ANTISTATIC, THERMOPLASTIC MOULDING COMPOUNDS BASED ON AROMATIC VINYL POLYMERS II

This is a continuation of application Ser. No. 151,285, filed Feb. 1, 1988, abandoned.

This invention relates to antistatic, thermoplastic moulding compositions based on optionally rubber-modified polymers of aromatic vinyl compounds such as styrene and/or α-methyl styrene and acrylonitrile and/or acrylates containing, as antistatic agent, a polyether which has been modified with a radical former.

Due to their chemical constitution, most plastics materials are electric insulators with a high electric surface resistance. They are therefore liable to accumulate an electrostatic charge on their surfaces both when processed and in use. This causes various kinds of trouble in use, e.g. objects made from the plastics rapidly become dirty and dusty with the formation of characteristic dust figures on the surface. This applies particularly to the optionally rubber modified polymers of aromatic vinyl compounds and acrylonitrile, such as styrene-acrylonitrile copolymers (SAN) and graft polymers of styrene and acrylonitrile on polybutadiene (ABS), used as moulding compositions.

It is known to render such moulding compositions antistatic. Recommended antistatic agents include, for example, alkyl and aryl sulphonates (German Auslegeschrift 1 544 652), amines (German Patent 1 258 083), quaternary ammonium salts, amides, phosphoric acids and alkyl and aryl phosphonates.

Moulding compounds treated with such antistatic agents are still unsatisfactory in some respects. Many of the antistatic agents mentioned are of low efficiency and must be used in high concentrations. Moreover, many of these low molecular weight antistatic agents migrate to the surface. Moulded objects with uneven and patchy surfaces or even deposits on the surfaces are therefore frequently obtained. In many cases, the mechanical properties such as the dimensional stability under heat are also severely impaired.

Pure polyethers such as those suggested as high molecular weight antistatic agents in German Patent 1 244 398 must be used in quantities of about 5% by weight or more to produce a reliable antistatic effect in styrene polymers. This results in patchy and smeary surfaces or even surface deposits on the finished moulded product.

Although the antistatic effect of such polyethers can be improved by the incorporation of styrene and acrylonitrile by graft polymerisation, as described in European Patent Application 0 061 692, styrene polymers containing such antistatic agents undergo yellow to brown discolouration when processed at temperatures above 150° C.

It has now been found that antistatic agents which are highly effective for aromatic vinyl polymers and do not impair the mechanical properties, surface properties, colour or thermostability of these polymers may be obtained by the treatment of polyalkylene ethers with radical forming substances. The antistatic effect obtained is greatly improved, particularly in comparison with that obtained with unmodified polyalkylene ethers.

The present invention relates to antistatic thermoplastic moulding compositions consisting of I. 99.8–95% by weight, preferably 99–97% by weight, of an optionally rubber modified polymer of aromatic vinyl compounds, other vinyl monomers and conventional additives and II. 0.2–5.0% by weight, preferably 1.0–3.0% by weight, of a polyalkylene ether which has been modified with a radical former.

The invention further relates to a process for the antistatic finishing of optionally rubber modified polymers of aromatic vinyl compounds and other vinyl monomers, wherein from 0.2 to 5% by weight, preferably from 1.0 to 3.0% by weight, of a polyalkylene ether which has been modified with a radical former is added to such polymers.

Optionally rubber modified copolymers of aromatic vinyl compounds and other vinyl monomers (I) in the context of the present invention are mixtures of (A) 0–100% by weight of one or more graft polymers and (B) 100 to 0% by weight of one or more thermoplastic vinyl polymers.

Graft polymers (A) for the purpose of the present invention have resin forming monomers such as styrene, α-methyl styrene, methyl methacrylate or a mixture of 95–50% by weight of styrene, α-methyl styrene, nuclear substituted styrene, methyl methacrylate or mixtures thereof and 5–50% by weight of (meth) acrylonitrile, maleic acid anhydride, N-substituted maleimides or mixtures thereof graft polymerised on a rubber. Suitable rubbers include virtually all rubbers which have glass transition temperatures below 10° C. Examples include polybutadiene, polyisoprene, styrene-butadiene copolymers, acrylonitrile-butadiene copolymers, acrylic rubbers, EPM rubbers (ethylene/propylene rubbers) and EPDM rubbers (ethylene/propylene/diene rubbers), which contain, as diene, a small quantity of an unconjugated diene such as hexa-1,5-diene or norbornadiene. Diene rubbers are preferred.

Graft copolymers (A) contain from 10–95% by weight, in particular from 20 to 70% by weight of rubber and from 90–5% by weight, in particular from 80 to 30% by weight, of graft copolymerised monomers. The rubbers are present in these graft copolymers in the form of at least partially crosslinked particles having an average particle diameter ($d_{50}$) of from 0.05 to 20.0 μm, preferably from 0.1 to 2.0 μm and most preferably from 0.1 to 0.8 μm. Graft copolymers of this type may be prepared by radical graft copolymerisation of styrene, α-methyl styrene, nuclear substituted styrene, (meth)acrylonitrile, methyl methacrylate, maleic acid anhydride or N-substituted maleimide in the presence of the rubbers which are to be grafted. The preferred methods of preparation are emulsion, solution, solvent free and suspension polymerisation.

The copolymers (B) may be synthesized from the graft monomers for (A) or similar monomers by polymerisation, in particular from styrene, α-methyl styrene, halogenated styrene, acrylonitrile, methacrylonitrile, methyl methacrylate, maleic acid anhydride, vinyl acetate, N-substituted maleimide or mixtures thereof. The copolymers are preferably composed of 95–50% by weight of styrene, α-methyl styrene, methyl methacrylate or mixtures thereof and 5 to 50% by weight of acrylonitrile, methacrylonitrile, methyl methacrylate, maleic acid anhydride or mixtures thereof. Copolymers of this type are also formed as byproducts of graft copolymerisation. It is customary to add separately prepared copolymers in addition to the copolymers contained in the graft polymer.

These separately prepared copolymers need not be chemically identical to the ungrafted resin components present in the graft polymers.

The separately prepared copolymers are suitably resinous, thermoplastic, rubber free copolymers, in particular copolymers of styrene and/or α-methyl styrene with acrylonitrile, optionally mixed with methyl methacrylate.

Copolymers consisting of 20 to 40% by weight of acrylonitrile and 80 to 60% by weight of styrene or α-methyl styrene are particularly preferred. Copolymers of this type are known and may be prepared in particular by radical polymerisation, in particular by emulsion, suspension, solution or solvent free polymerisation. The copolymers preferably have molecular weights of from 15,000 to $2.10^5$.

The modified polyethers (II) for the purpose of this invention are prepared by the treatment of polyethers with radical formers.

The polyalkylene ethers which are to be modified according to the invention are synthesized from di- and polyfunctional (cyclo)aliphatic residues and may contain small quantities of olefinic groups. Examples of suitable polyalkylene ethers include reaction products of diols or polyols, ethylene glycol, 1,2-propylene glycol, trimethylol propane, glycerol, pentaerythritol, sorbitol and mannitol and one or more alkylene oxides such as ethylene oxide or propylene oxide (for preparation and use, see Ullmanns Encyklopadie der technischen Chemie, 4th Edition, Volume 19, Page 31, Verlag Chemie, Weinheim 1980). Polyalkylene glycols containing high proportions of 1,2-propylene structures are preferred.

Both straight chained and branched polyalkylene glycols may be used, moderately branched types being preferred.

The "Starting" polyalkylene glycols have molecular weights of from 500 to 15,000, preferably from 1,000 to 10,000, most preferably from 2,000 to 5,000.

The radical forming substances may be the commercial compounds conventionally used as initiators for radical polymerisation or any other compounds which decompose into radicals sufficiently rapidly at temperatures of from 20° to 200° C. Examples of suitable radical formers include diacyl peroxides such as dibenzoyl peroxide, substituted dibenzoyl peroxides and dilauryl peroxide, acyl sulphonyl peroxides such as acetyl cyclohexane sulphonyl peroxide, peroxidicarbonates such as dicyclohexyl and di-tert-butyl peroxidicarbonate, acyl peresters such as tert-butyl perpivalate and tert-butyl perbenzoate, dialkyl peroxides such as dicumyl and di-tert-butyl peroxide, hydroperoxides such as cumyl hydroperoxide and tert-butyl hydroperoxide and other peroxy compounds as well as aliphatic and araliphatic azo compounds. Preferred radical formers decompose sufficiently rapidly at temperatures of from 60° to 140° C., e.g. azo-diiso-butyronitrile, di-tert-butyl peroxide, dibenzoyl peroxide, tert-butyl perbenzoate, dicumyl peroxide and 1,3-bis-(tert-butyl-peroxy-isopropyl)-benzene. Dibenzoyl peroxide is particularly preferred.

The quantity of radical formers, based on the quantity of polyalkylene glycol, is from 5 to 0.05% by weight, preferably from 2.0 to 0.1% by weight and most preferably from 1.0 to 0.25% by weight.

The modified polyalkylene ethers according to this invention may be prepared by simply stirring the radical former and the polyalkylene glycol together at temperatures of from 50° to 150° C.

The modified polyalkylene ethers obtained may then be incorporated in the polymers by known methods, e.g. by kneading them together with the polymers which are to be treated or by treatment with rollers or extrusion.

According to another embodiment of the invention, a mixture of a radical former to be used according to the invention and a polyether to be used according to the invention may be incorporated under the usual processing conditions into the polymer to be treated, e.g. by means of a kneader or extruder at 160° to 220° C.

In addition to the antistatic agents according to the invention, conventional additives such as pigments, fillers, stabilizers, lubricants, mould release agents, flame retardants and the like may be added to the moulding compounds.

The moulding compounds according to the invention obtained as described above are made up into the finished articles such as housing parts for domestic and electrical apparatus, sections, films and foils and internal fittings for motor vehicles, etc. by the usual methods employed for thermoplasts.

The finished products are distinguished by their excellent antistatic properties and in particular by their surfaces, which are homogenous and shiny and free from deposits. The mechanical properties, especially the dimensional stability under heat and the impact strength, including the impact strength at low temperatures, undergo virtually no loss compared with the properties of the unmodified material. The colour of the moulded parts is also unaffected.

EXAMPLE

Component I:

Polymer I-A:

a) 60 parts by weight of thermoplastic SAN resin phase of 72 parts by weight of styrene and 28 parts by weight of acrylonitrile having a limiting viscosity number $\pi_i = 55$ (ml/g) (determined in DMF at 23° C.) and b) 40 parts by weight of elastomer phase consisting of a graft polymer of 36 parts by weight of styrene and 14 parts by weight of acrylonitrile on 50 parts by weight of polybutadiene. The graft basis is 50:50% bimodal with $D_{50}$ values of about 400 and 100 nm.

Polymer I-B:

Composition same as I-A, but coloured black with 1% by weight of carbon black.

Polymer I-C:

Composition same as I-A, but the thermoplastic SAN resin phase has a limiting viscosity number $\pi_i$ of 75 ml/g (determined in DMF at 23° C.). Polymer I-C contains no colouring agent.

Polyether II:

Polyether II-a 1.00 kg of a straight chained polypropylene glycol having an average molecular weight $M_N$ of 2,000 (OH number = 56) is degased by heating under vacuum and then saturated with nitrogen on cooling. 5.0 g of commercial dibenzoyl peroxide are added at about 40° C. and the mixture is heated to 80°–85° C. under nitrogen for 8 hours.

Polyether II-b 1.00 kg of the polypropylene glycol used for II-a is treated with 10.0 g of dibenzoyl peroxide as described in the previous experiment.

Polyether II-c 200 g of the polypropylene glycol used for II-a are degased by heating under vacuum and saturated with nitrogen on cooling. 0.75 g of commerical azo-bis-isobutyronitrile is added at about 35° C. and the mixture is heated under nitrogen at 70°-75° C. for 8 hours.

Polyether II-d 200 g of the polypropylene glycol used for II-a are treated by a method analogous to that of the previous experiment with 0.70 g of di-tert-butyl peroxide at 130°-135° C. for 8 hours.

Polyether II-e

A homogeneous mixture is prepared from 250 g of the straight chained polypropylene glycol used for II-a and a solution of 1.5 g of commercial dibenzoyl peroxide in 50 ml of ethyl acetate at 20° C. and the solvent is then distilled off under vacuum.

Polyether II-f

A homogeneous mixture is prepared in a manner analogous to that of the previous experiment from 250 g of a branched chain polyalkylene glycol with OH number 34 based on trimethylol propane, propylene oxide and ethylene oxide and 1.25 g of 1,3-bis-(tert-butyl-peroxy-isopropyl)-benzene in a manner analogous to that of the previous experiment.

Polyether II-g for comparison

Straight chained polypropylene glycol having an average molecular weight of $M_N = 2,000$. (Identical to starting material in II-a)

Polyether II-h for comparison

Tris-hydroxy-ethylated dodecylamine.

Incorporation of components II (antistatic agents) into components I:

Components I were in the form of granulates of commercial ABS polymers.

The antistatic agents were weighed and added and were homogenously distributed in the ABS polymer by kneading the components together and at the same time melting them in a 3 litre internal kneader of the BANBURY type. The temperature rose to values of up to 210° C. within a kneading time of 3 to 5 minutes. The ejected melts (dolls) were rolled flat, cut up and granulated. Test samples were prepared by injection moulding in the usual manner.

The antistatic properties were tested by placing moulded parts measuring 155×75×2 (mm) into very dusty surroundings and observing the development of dust figures (1 to several days and then several weeks). Comparison samples which have not been finished antistatically and samples containing finishes according to the state of the art were included in each test series.

The same moulded part was also used for assessing the surface quality (gloss, uniformity, formation of patches, formation of flow lines).

The gloss was determined according to ASTM D 523 or DIN 67 530. In some cases, a telephone casing was produced by injection moulding to serve as a type of moulded part which would be used in practice. Moreover, slight differences in surface quality can be detected on the curved surfaces.

To test the thermostability, sample plates measuring 60×40×2 (mm) were injection moulded in (long) cycles of 75 seconds at mass temperatures rising from 220° C. to 280° C. The raw tone, colour changes and changes in the surface (e.g. the formation of silver streaks) were assessed visually.

The most important mechanical properties (impact strength and notched impact strength according to DIN 53 453, hardness according to DIN 53 456) as well as the Vicat softening temperature (B 120 according to DIN 53 460) which is important as an aim of development were determined on standard small rods 50×6×4 (mm).

TABLE

| Example | Polymer I | Polyether II | $C_{II}$ (% by weight) | Thermo Stability | Surface | Δ Vicat (°C.) | Antistatic Effect |
|---|---|---|---|---|---|---|---|
| 1 | A | — | — | + | + | 0 | — |
| 2 | B | — | — |  | + | 0 | — |
| 3 | C | — | — | (+) | (+) | 0 | — |
| according to the invention | | | | | | | |
| 4 | A | a | 1.0 | + | + | −0.5 | (+) |
| 5 | A | a | 1.5 |  | + | −1.0 | + |
| 6 | B | a | 1.0 |  | + | 0 | (+) |
| 7 | A | b | 1.0 | + | + | −1.5 | + |
| 8 | A | c | 1.5 | + | + | −1.5 | (+) |
| 9 | A | d | 1.5 | + | + | −1.0 | + |
| 10 | C | e | 1.0 |  | + | −1.0 | + |
| 11 | C | f | 1.0 |  | + | −2.0 | + |
| for comparison | | | | | | | |
| 12 | A | g | 1.0 |  | | | −4.0 | | |
| 13 | C | g | 1.0 |  | + | −2.0 | − |
| 14 | A | h | 1.0 | | | (+) | −3.5 | + |
| 15 | C | h | 1.0 |  | | | −4.0 | (+) |

The Vicat softening temperatures were given as difference values (ΔVicat) by comparison with polymers I-A to C which had not been antistatically finished.

For the sake of clarity, all test results are expressed by symbols in the tables. These symbols have the following meanings:

+ = very good
(+) = good
| = with weaknesses
(−) = weak
— = unusable

The Table shows that the antistatic agents according to the present invention have clear advantages over the antistatic agents used in the known art. For a comparable antistatic effect, there is considerably less loss in dimensional stability under heat and the antistatic agents result in products with improved thermostability and surfaces with less tendency to form visible faults.

We claim:

1. Process for the antistatic finishing of polymers containing copolymerized aromatic vinyl compounds and other vinyl monomers or said polymers which are rubber modified, which comprises blending into the polymers 0.2 to 5% by weight of a modified ether consisting essentially of a polyalkylene ether reacted with a radical former at 50°–150° C. in amounts from 5 to 0.05% by weight, based on the quantity of polyalkylene ether, wherein the radical former is a compound selected from the group consisting of diacyl peroxides, acyl sulphonyl peroxides, peroxidicarbonates, acyl peresters, dialkyl peroxides, hydro peroxides, other peroxy compounds, aliphatic azo compounds and araliphatic azo compounds.

2. The process according to claim 1 wherein the polyalkylene ether is reacted with a radical former in amounts from 2.0 to 0.1% by weight.

3. The process according to claim 1 wherein the polyalkylene ether is reacted with a radical former in amounts from 1.0 to 0.25% by weight.

4. The process according to claim 1 wherein the modified polyalkylene ether is blended into the polymers in amounts from 1.0 to 3.0% by weight.

* * * * *